United States Patent
Wang et al.

(10) Patent No.: US 10,174,141 B2
(45) Date of Patent: Jan. 8, 2019

(54) PREPARATION METHOD OF A CATALYST COMPONENT FOR OLEFIN POLYMERIZATION

(71) Applicants: China Petroleum & Chemical Corporation, Beijing (CN); Beijing Research Institute of Chemical Industry, China Petroleum & Chemical Corporation, Beijing (CN)

(72) Inventors: Shibo Wang, Beijing (CN); Junling Zhou, Beijing (CN); Dongbing Liu, Beijing (CN); Lei Zhang, Beijing (CN); Xinping Lv, Beijing (CN); Bingquan Mao, Beijing (CN); Zhenjie Liu, Beijing (CN); Xin Zhou, Beijing (CN); Changli Zhang, Beijing (CN); Baoquan Xing, Beijing (CN)

(73) Assignee: China Petroleum & Chemical Corporation Beijing Research Institute of Chemical Industry, China Petroleum & Chemical Corporation, Beijing (CN)

( * ) Notice: Subject to any disclaimer, the term of this patent is extended or adjusted under 35 U.S.C. 154(b) by 0 days.

(21) Appl. No.: 15/307,209

(22) PCT Filed: Apr. 29, 2015

(86) PCT No.: PCT/CN2015/077844
§ 371 (c)(1),
(2) Date: Oct. 27, 2016

(87) PCT Pub. No.: WO2015/165405
PCT Pub. Date: Nov. 5, 2015

(65) Prior Publication Data
US 2017/0051086 A1 Feb. 23, 2017

(30) Foreign Application Priority Data

| Apr. 29, 2014 | (CN) | 2014 1 0176103 |
| Apr. 29, 2014 | (CN) | 2014 1 0176105 |
| Apr. 29, 2014 | (CN) | 2014 1 0176179 |
| Apr. 29, 2014 | (CN) | 2014 1 0176229 |
| Apr. 29, 2014 | (CN) | 2014 1 0177192 |
| Apr. 29, 2014 | (CN) | 2014 1 0177203 |
| Apr. 29, 2014 | (CN) | 2014 1 0177228 |

(51) Int. Cl.
    C08F 110/02     (2006.01)
(52) U.S. Cl.
    CPC .................. C08F 110/02 (2013.01)

(58) Field of Classification Search
None
See application file for complete search history.

(56) References Cited

U.S. PATENT DOCUMENTS

| 2009/0318643 A1* | 12/2009 | Chen | B01J 31/128 |
| | | | 526/123.1 |
| 2011/0046325 A1* | 2/2011 | Zhang | C08F 10/02 |
| | | | 526/123.1 |

FOREIGN PATENT DOCUMENTS

| CN | 101472957 A | 7/2009 |
| CN | 101880342 A | 11/2010 |
| CN | 103059175 A | 4/2013 |
| CN | 103087222 A | 5/2013 |
| CN | 103087224 A | 5/2013 |
| JP | 6-157658 | 6/1994 |
| WO | WO 2012/112264 A1 | 8/2012 |

OTHER PUBLICATIONS

International Search Report from the State Intellectual Property Office of the P.R. China for International Application No. PCT/CN2015/077844 dated Aug. 30, 2015.

* cited by examiner

*Primary Examiner* — Catherine S Branch
(74) *Attorney, Agent, or Firm* — Finnegan, Henderson, Farabow, Garrett & Dunner, LLP

(57) ABSTRACT

The present invention provides a preparation method of a catalyst component for olefin polymerization, comprising firstly dissolving an anhydrous magnesium halide into a mixed solvent which comprises an oxygen-containing organic titanium compound, an organic epoxy compound, a hydroxy-containing compound, and an inert solvent, and does not comprise a phosphate compound, so as to form a magnesium halide solution; then mixing the magnesium halide solution with a halogen-containing compound to precipitate a solid, so as to obtain the catalyst component, wherein the halogen-containing compound comprises at least one selected from a group consisting of halogen and titanium-containing compounds, halogenated organic hydrocarbon compounds, acyl halide compounds, halogen and phosphorus-containing compounds, halogen and boron-containing compounds, halogenated organic aluminum compounds, and halogen and silicon-containing compounds. The catalyst component prepared by the present invention has better particle morphology, and a good hydrogen response, and thus is favorable to use of the catalyst in a slurry or gas polymerization process device.

21 Claims, No Drawings

PREPARATION METHOD OF A CATALYST COMPONENT FOR OLEFIN POLYMERIZATION

CROSS-REFERENCE TO RELATED APPLICATIONS

The present application claims the priority of Chinese patent applications CN201410176103.3, CN201410177203.8, CN201410176105.2, CN201410176229.0, CN201410177192.3, CN201410176179.6, and CN201410177228.8, filed on Apr. 29, 2014, the entirety of which is incorporated herein by reference.

TECHNICAL FIELD

The present invention belongs to the technical field of preparation of catalysts for olefin polymerization. The present invention relates to a preparation method of a catalyst component for olefin polymerization, and further relates to a catalyst component for olefin polymerization or copolymerization and preparation method thereof.

TECHNICAL BACKGROUND

With the development of olefin polymerization techniques, much progress has been made on the catalysts used in the polymerization techniques. High efficiency catalysts, by virtue of their good polymerization property and mature application technologies, still play an important part in catalysts for polymerization of olefins. With more and more attention being paid to the development and production of new structural polyolefin resins, there are increasingly more requirements for comprehensive properties of olefin polymerization catalysts. Catalysts are required not only to adapt to processing apparatus, but also to be capable of adjusting and controlling structures of resins. Years of explorations and researchers have shown that Mg—Ti based high efficiency catalysts are suitable for such applications.

Currently, Mg—Ti based high efficiency catalysts are mainly prepared by means of dissolving and precipitating, i.e., dissolving a magnesium compound first in a solvent and then precipitating. For example, JPS54-40293 discloses dissolving of magnesium compounds with titanate; JPS56-811 and JPS58-83006 disclose dissolving of magnesium compounds with alcohols, aldehydes, amines, carboxylic acids; JPS58-19307 discloses dissolving of magnesium compounds with organic phosphorus compounds; and JPS58-183708 discloses dissolving of magnesium compounds with a mixture of organic epoxy compounds and organic phosphorus compounds (phosphate compounds).

While the above solutions for dissolving magnesium compounds can to some extent eliminate the defects of grinding method, they could still be improved. For example, in JPS5440293, JPS58-19307, and JPS58-183708, when the catalyst separated from the solution of the magnesium compound as a precipitate is used in olefin polymerization, its catalyst activity is relatively low and decays distinctly with continuation of the polymerization, and the bulk density of the obtained polymer is also low.

In addition, Mg—Ti based high efficiency catalysts are also prepared by chemical reaction methods, in which chemical materials such as organic magnesium metal compound, chlorinating agent, and transitional metal titanium compound are used to prepare different types of catalysts. Such methods are disclosed in Chinese patents CN1158136, CN1299375, CN1795213, and U.S. Pat. No. 3,787,384, U.S. Pat. No. 4,148,754, U.S. Pat. No. 4,173,547, U.S. Pat. No. 4,508,843, and U.S. Pat. No. 5,124,296. Though performance of such Mg—Ti catalysts can be easily modulated, catalysts obtained are not in a good particle form, and have a wide distribution and even multimodal distribution, which is not good for long-term steady operation of polymerization plants.

In view of the foregoing, it is desirable to provide an olefin polymerization catalyst component that is high in activity, slow in decay of activity, good in hydrogen response, and conducive to long-term steady operation of polymerization plants.

SUMMARY OF THE INVENTION

Directed against the deficiency of the prior art, the present invention aims to provide a preparation method of a catalyst component for olefin polymerization. The catalyst component for olefin polymerization prepared by the method has a high activity of polymerization, slow rate of activity decay, and good hydrogen response, and is conducive to a long-term steady operation of polymerization plants.

In order to achieve the above objective, the inventors of the present invention have conducted extensive researches on catalyst components and activity thereof. The inventors of the present invention found through a large number of experiments that a catalyst system suitable for olefin polymerization or copolymerization can be obtained by selecting a suitable magnesium halide system for dissolving and precipitating during the preparation of the catalyst. Such catalyst system has a quite high activity of polymerization, stable polymerization dynamics, slow rate of activity decay, and good hydrogen response. The catalyst has good particle morphology and narrow particle size distribution, thus leading to good particle morphology, narrow particle size distribution, few fine powder, and large bulk density of the polymer. This is conductive to the long-term steady operation of polymerization plants, and the polymer of olefin with three or more carbons has a very high stereoregularity. In addition, the synthesis of the catalyst has advantages such as low consumption of raw materials, high utilization rate of device, easy operation, and being environmentally friendly. The present invention is base on the above findings.

In one aspect, the present invention provides a catalyst component for olefin polymerization, which is obtained by mixing a magnesium halide solution containing an organic epoxy compound with a halogen-containing compound to precipitate a solid; wherein, the organic epoxy compound is a three membered epoxy compound as shown in Formula I,

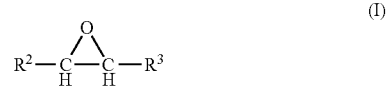

(I)

in Formula I, $R^2$ are $R^3$ are independently selected from H, or $C_1$-$C_{10}$ hydrocarbyl or halogenated hydrocarbyl, and can be a saturated or unsaturated straight, branched, or cyclic chain; or the organic epoxy compound is a 4-8 membered epoxy compound; the halogen-containing compound comprises at least one selected from a group consisting of halogen and titanium-containing compounds, halogenated organic hydrocarbon compounds, acyl halide compounds, halogen and phosphorus-containing compounds, halogen and boron-containing compounds, halogenated organic aluminium compounds, and halogen and silicon-containing compounds; the magnesium halide solution is formed by dissolving an anhydrous magnesium halide into a mixed solvent which comprises an oxygen-containing organic titanium compound, the organic epoxy compound, a hydroxy-containing compound, and an inert solvent.

According to the present invention, the magnesium halide solution is formed by dissolving the anhydrous magnesium halide into a mixed solvent which is comprised of the oxygen-containing organic titanium compound, the organic epoxy compound, the hydroxy-containing compound, and the inert solvent.

As described above, the inventors of the present invention found through a large number of experiments that, a catalyst system suitable for olefin polymerization or copolymerization can be obtained by selecting a suitable magnesium halide system for dissolving and precipitating during the preparation of the catalyst. Moreover, unexpectedly, the inventors of the present invention found that by adopting a mixed solvent containing an oxygen-containing organic titanium compound, an organic epoxy compound, a hydroxy-containing compound, and an inert solvent, preferably a mixed solvent comprised of an oxygen-containing organic titanium compound, an organic epoxy compound, a hydroxy-containing compound, and an inert solvent, anhydrous magnesium halide can be fully dissolved to form a uniform magnesium halide solution, obtained by mixing the formed magnesium halide solution with a halogen-containing compound and then precipitating a solid. The catalyst component has a quite high activity of polymerization, stable polymerization dynamics, slow rate of activity decay, and good hydrogen response. The catalyst also has good particle morphology and narrow particle size distribution, thus leading to good particle morphology, narrow particle size distribution, few fine powder, and large bulk density of the polymer. This is conductive to the long-term steady operation of polymerization plants, and the polymer of olefin with three or more carbons has a very high stereoregularity.

In one or more embodiments of the present invention, the magnesium halide is as shown in Formula $MgX_2$, in which X is halogen; the oxygen-containing organic titanium compound is as shown in Formula $Ti(OR^1)_nX_{4-n}$, in which $R^1$ is $C_1$-$C_{20}$ hydrocarbyl, and can be a saturated or unsaturated straight, branched, or cyclic chain, $0<n\leq 4$, and X is halogen; the hydroxy-containing compound is as shown in Formula $HOR^4$, in which $R^4$ is $C_1$-$C_{20}$ hydrocarbyl, and can be a saturated or unsaturated straight, branched, or cyclic chain; the inert solvent is $C_3$-$C_{100}$ aliphatic hydrocarbon or halogenated aliphatic hydrocarbon, aromatic hydrocarbon or halogenated aromatic hydrocarbon, and can be a saturated or unsaturated straight, branched, or cyclic chain; preferably, the inert solvent is a $C_4$-$C_{20}$ hydrocarbon.

In one or more embodiments of the present invention, the magnesium halide is selected from a group consisting of magnesium chloride, magnesium bromide, magnesium iodide and mixtures thereof; the oxygen-containing organic titanium compound is selected from a group consisting of titanate compounds and mixtures thereof, preferably from a group consisting of tetraethyl titanate, tetraisopropyl titanate, tetrabutyl titanate, and tetraisooctyl titanate; the hydroxy-containing compound is selected from a group consisting of aliphatic alcohols, aromatic alcohols, or phenols, preferably from a group consisting of methanol, ethanol, isopropanol, n-butanol, n-hexanol, isooctanol, benzyl alcohol, and phenethyl alcohol; the inert solvent is selected from a group consisting of benzene, toluene, xylene, n-butane, isobutane, isopentane, pentane, n-hexane, cyclohexane, heptane, octane, decane, 1,2-dichloroethane, chlorobenzene and mixtures thereof.

According to the present invention, calculated based on per molar magnesium halide, the oxygen-containing organic titanium compound is 0.01-2.0 mol, preferably 0.1-1.5 mol; the organic epoxy compound is 0.01-10 mol, preferably 0.1-6.5 mol; the hydroxy-containing compound is 0.01-20 mol, preferably 0.1-15 mol; the halogen-containing compound is 0.1-100 mol, preferably 0.5-50 mol.

According to the present invention, the organic epoxy compound is one or more selected from a group consisting of ethylene oxide, propylene oxide, butylenes oxide, butadiene oxide, butadiene dioxide, epoxy chloropropane, methyl glycidyl ether, diglycidyl ether, and terahydrofuran.

In one or more embodiments of the present invention, the halogen and titanium-containing compound is a compound as shown in Formula $Ti(OR^5)_nX_{4-n}$, in which $R^5$ is $C_1$-$C_{20}$ hydrocarbyl, or halogenated hydrocarbyl, and can be a saturated or unsaturated straight, branched, or cyclic chain, $0<n\leq 3$, and X is halogen. The halogen and titanium-containing compound is at least one selected from a group consisting of titanium tetrachloride, titanium tetrabromide, titanium tetraiodide, triethoxy titanium chloride, diethoxy titanium dichloride, and ethoxy titanium trichloride; preferably the magnesium halide is selected from a group consisting of titanium tetrachloride, titanium tetrabromide, and titanium tetraiodide.

In one or more embodiments of the present invention, the halogenated organic hydrocarbon compound is a compound as shown in Formula $R^5X$, in which $R^5$ is $C_1$-$C_{20}$ hydrocarbyl, or halogenated hydrocarbyl, can be a saturated or unsaturated straight, branched, or cyclic chain, and X is halogen. The halogenated organic hydrocarbon compound is at least one selected from a group consisting of chlorocyclohexane, bromocyclohexane, chloro-t-butane, bromo-t-butane, chlorobenzene, trichlorobenzene, 1,1-dichloroethane, and 1,1-dichloropropane.

According to the present invention, the acyl halide compound is a compound as shown in Formula $R^5COX$, in which $R^5$ is $C_1$-$C_{20}$ hydrocarbyl, or hydrogen, and can be a saturated or unsaturated straight, branched, or cyclic chain, and X is halogen. The acyl halide compound comprises at least one selected from a group consisting of acyl fluoride compounds, acyl chloride compounds, acyl bromide compounds, and acyl iodide compounds; preferably, the acyl halide compound is an acyl chloride compound.

In one or more embodiments of the present invention, the acyl chloride compound is a compound as shown in Formula $R^5COCl$, in which $R^5$ is $C_1$-$C_{20}$ hydrocarbyl, or hydrogen, and can be a saturated or unsaturated straight, branched, or cyclic chain. The acyl chloride compound is at least one selected from a group consisting of formyl chloride, acetyl chloride, propionyl chloride, butyryl chloride, benzoyl chloride, phthaloyl dichloride, phenylacetyl chloride, phenylpropionyl chloride, and phenylbutyryl chloride.

In one or more embodiments of the present invention, the halogen and phosphorus-containing compound is a compound as shown in Formula $O_pPR^5_qX_{3-q}$, in which $R^5$ is $C_1$-$C_{20}$ alkyl or alkoxy, $0\leq q<3$, $p=0$ or $1$, and X is halogen; or the halogen and phosphorus-containing compound is phosphorus pentachloride. The halogen and phosphorus-containing compound is at least one selected from a group consisting of methyldichlorophosphine, ethyldichlorophosphine, butyldichlorophosphine, phosphorus trichloride, phosphorus pentachloride, phosphorus oxychloride, methyl dichlorophosphate, ethyl dichlorophosphate, and butyl dichlorophosphate; preferably the halogen and phosphorus-containing compound is selected from a group consisting of phosphorus trichloride, phosphorus pentachloride, and phosphorus oxychloride.

In one or more embodiments of the present invention, the halogen and boron-containing compound is a compound as shown in Formula $BR^5{}_qX_{3-q}$, in which $R^5$ is $C_1$-$C_{20}$ alkyl or alkoxy, $0 \leq q < 3$, and X is halogen. The halogen and boron-containing compound is at least one selected from a group consisting of methylboron dichloride, ethylboron dichloride, butylboron dichloride, methoxyboron dichloride, ethoxyboron dichloride, boron trichloride, and butoxyboron dichloride.

In one or more embodiments of the present invention, the halogenated organic aluminium compound is a compound as shown in Formula $AlR^5{}_nX_{3-n}$, in which $R^5$ is $C_1$-$C_{20}$ hydrocarbyl, preferably being a straight or branched chain hydrocarbyl having no more than 6 carbon atoms, $0.5 \leq n \leq 2.5$, and X is halogen. The halogenated organic aluminium compound is at least one selected from a group consisting of ethyl aluminium dichloride, ethylaluminum sesquichloride, diethyl aluminium chloride, and isopropyl aluminium dichloride.

In one or more embodiments of the present invention, the halogen and silicon-containing compound is a compound as shown in Formula $(R^5O)_qSiR^6{}_nX_{4-n-q}$, in which $R^5$ and $R^6$ are independently selected from $C_1$-$C_{20}$ hydrocarbyl or halogenated hydrocarbyl, and can be saturated or unsaturated straight, branched, or cyclic chain; each of q and n is 0 or a positive number, and $0 \leq q+n \leq 3$; X is halogen. The halogen and silicon-containing compound is at least one selected from a group consisting of silicon tetrachloride, silicon tetrabromide, ethoxysilicon trichloride, phenylsilicon trichloride, methylsilicon trichloride, ethylsilicon trichloride, diethoxysilicon dichloride, methylmethoxysilicon dichloride, and methylphenoxysilicon dichloride; preferably the halogen and silicon-containing compound is at least one selected from a group consisting of silicon tetrachloride, silicon tetrabromide, ethoxysilicon trichloride, and phenylsilicon trichloride.

In another aspect, the present invention provides a preparation method of a catalyst component for olefin polymerization, comprising the steps of firstly dissolving an anhydrous magnesium halide into a mixed solvent which comprises an oxygen-containing organic titanium compound, an organic epoxy compound, a hydroxy-containing compound, and an inert solvent, and does not comprise a phosphate compound, so as to form a magnesium halide solution; then mixing the magnesium halide solution with a halogen-containing compound to precipitate a solid, so as to obtain the catalyst component; wherein the organic epoxy compound is a three membered epoxy compound as shown in Formula I,

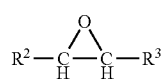

(I)

in Formula I, $R^2$ are $R^3$ are independently selected from H, or $C_1$-$C_{10}$ hydrocarbyl or halogenated hydrocarbyl, and can be saturated or unsaturated straight, branched, or cyclic chain; or the organic epoxy compound is a 4-8 membered epoxy compound; the halogen-containing compound comprises at least one selected from a group consisting of halogen and titanium-containing compounds, halogenated organic hydrocarbon compounds, acyl halide compounds, halogen and phosphorus-containing compounds, halogen and boron-containing compounds, halogenated organic aluminium compounds, and halogen and silicon-containing compounds.

The magnesium halide solution obtained in the present invention is amorphous magnesium halide. In other words, the magnesium halide solution of the present invention does not contain crystalline magnesium halide. In the present invention, the is raw material anhydrous magnesium halide is a crystalline magnesium halide, which can be a crystalline form such as α, β, or γ and the like. In the present invention, in addition to the above four indispensible organic solvents, the mixed solvent can contain other organic solvents, for example an organic solvent which is selected from esters, ketones, amines, etc. The amounts of these other organic solvents are selected on the premise that the phase state of the final magnesium halide solution product will not be affected.

In the present invention, the mixed solvent does not contain a phosphate compound, so that the magnesium halide solution can have a better performance in the downstream application. For example, when used in the preparation of catalyst, it enables the solid component to precipitate easily and enables the activity of the corresponding catalyst to be increased. Meanwhile, it can avoid remains of toxic phosphorus-containing substance in the downstream catalyst product. In the present invention, the phosphate compound is selected from tributyl phosphate, tributyl phosphate, tripropyl phosphate, triethyl phosphate, or trimethyl phosphate.

Preferably, in the present invention, the magnesium halide solution is formed by dissolving an anhydrous magnesium halide into a mixed solvent consisting of an oxygen-containing organic titanium compound, the organic epoxy compound, hydroxy-containing compound, and an inert solvent. That is, preferably, the mixed solvent of the present invention only comprises the above four indispensible organic solvents.

In one or more embodiments, the magnesium halide is as shown in Formula $MgX_2$, in which X is halogen. The oxygen-containing organic titanium compound is as shown in Formula $Ti(OR^1)_nX_{4-n}$, in which $R^1$ is $C_1$-$C_{20}$ hydrocarbyl, and can be a saturated or unsaturated straight, branched, or cyclic chain, $0 < n \leq 4$, and X is halogen. Preferably, the tetravalent titanium compounds are used, because they are in liquid state at room temperature and generally have good compatibility with some solvents. The titanium compound specifically used in the reaction is preferably selected from the compounds as shown in Formula $Ti(OR^1)_nX_{4-n}$, in which n=4 or a mixture thereof. Tetrabutyl titanate is the most commonly used compound. The hydroxy-containing compound is as shown in Formula $HOR^4$, in which $R^4$ is $C_1$-$C_{20}$ hydrocarbyl, and can be a saturated or unsaturated straight, branched, or cyclic chain; the inert solvent is $C_3$-$C_{100}$ aliphatic hydrocarbon or halogenated aliphatic hydrocarbon, aromatic hydrocarbon or halogenated aromatic hydrocarbon, and can be a saturated or unsaturated straight, branched, or cyclic chain; preferably, the inert solvent is a $C_4$-$C_{20}$ hydrocarbon.

Preferably, the magnesium halide is selected from a group consisting of magnesium chloride, magnesium bromide, magnesium iodide and mixtures thereof, and more preferably the magnesium halide used in the reaction is magnesium chloride or a mixture containing magnesium chloride; the oxygen-containing organic titanium compound is selected from a group consisting of titanate compounds and mixtures thereof, preferably from tetraethyl titanate, tetraisopropyl titanate, tetrabutyl titanate, and tetraisooctyl titanate; the hydroxy-containing compound is an aliphatic alcohol, aromatic alcohol, or phenol, preferably from the hydroxy-containing compound is selected from a group consisting of methanol, ethanol, isopropanol, n-butanol, n-hexanol, isooctanol, benzyl alcohol, and phenethyl alcohol; the inert solvent is selected from a group consisting of benzene, toluene, xylene, n-butane, isobutane, isopentane, pentane, n-hexane, cyclohexane, heptane, octane, decane, 1,2-dichloroethane, chlorobenzene and mixtures thereof.

In one or more embodiments, calculated based on per molar magnesium halide, the oxygen-containing organic titanium compound is 0.01-2.0 mol, preferably 0.1-1.5 mol; the organic epoxy compound is 0.01-10 mol, preferably 0.1-6.5 mol; the hydroxy-containing compound is 0.01-20 mol, preferably 0.1-15 mol; the halogen-containing compound is 0.1-100 mol, preferably 0.5-50 mol.

In one or more embodiments, the molar concentration of magnesium halide in the magnesium halide solution ranges from 0.0001 to 20 mol/L, preferably from 0.001 to 10 mol/L.

The inventors of the present invention found through a large number of experiments that, by adopting a mixed solvent containing an oxygen-containing organic titanium compound, an organic epoxy compound, a hydroxy-containing compound, and an inert solvent, preferably a mixed solvent comprised of an oxygen-containing organic titanium compound, an organic epoxy compound, a hydroxy-containing compound, and an inert solvent according to the above composition, anhydrous magnesium halide can be fully dissolved to form a uniform magnesium halide solution. Further, a catalyst component for olefin polymerization or copolymerization can be obtained by mixing the formed magnesium halide solution with a halogen-containing compound and then precipitating a solid. The catalyst component has a quite high activity of polymerization, stable polymerization dynamics, slow rate of activity decay, and good hydrogen response. The catalyst has good particle morphology and narrow particle size distribution, thus leading to good particle morphology, narrow particle size distribution, few fine powder, and large bulk density of the polymer. This is conductive to the long-term steady operation of polymerization plants, and the polymer of olefin with three or more carbons has a very high stereoregularity.

In the present invention, preferably, the organic epoxy compound as shown in Formula I comprises $C_2$-$C_8$ aliphatic olefin, dialkenes, halogenated aliphatic olefin, oxide of dialkenes, glycidyl ethers or inner ethers and the like. Preferably, the organic epoxy compound is one or more selected from a group consisting of ethylene oxide, propylene oxide, butylenes oxide, butadiene oxide, butadiene dioxide, epoxy chloropropane, methyl glycidyl ether, diglycidyl ether, and terahydrofuran.

In one or more embodiments, the halogen and titanium-containing compound is a compound as shown in Formula $Ti(OR^5)_nX_{4-n}$, in which $R^5$ is $C_1$-$C_{20}$ hydrocarbyl, or halogenated hydrocarbyl, and can be a saturated or unsaturated straight, branched, or cyclic chain, 0≤n≤3, and X is halogen.

In the present invention, preferably the halogen and titanium-containing compound is at least one selected from a group consisting of titanium tetrachloride, titanium tetrabromide, titanium tetraiodide, triethoxy titanium chloride, diethoxy titanium dichloride, and ethoxy titanium trichloride; preferably the halogen and titanium-containing compound is selected from a group consisting of titanium tetrachloride, titanium tetrabromide, and titanium tetraiodide.

In one or more embodiments, the halogenated organic hydrocarbon compound is a compound as shown in Formula $R^5X$, in which $R^5$ is $C_1$-$C_{20}$ hydrocarbyl, or halogenated hydrocarbyl, and can be a saturated or unsaturated straight, branched, or cyclic chain, and X is halogen.

In the present invention, preferably, the halogenated organic hydrocarbon compound is at least one selected from a group consisting of chlorocyclohexane, bromocyclohexane, chloro-t-butane, bromo-t-butane, chlorobenzene, trichlorobenzene, 1,1-dichloroethane and 1,1-dichloropropane.

In one or more embodiments, the acyl halide compound is a compound as shown in Formula $R^5COX$, in which $R^5$ is $C_1$-$C_{20}$ hydrocarbyl, or hydrogen, and can be a saturated or unsaturated straight, branched, or cyclic chain, and X is halogen.

In the present invention, the acyl halide compound comprises at least one of acyl fluoride compound, acyl chloride compound, acyl bromide compound, and acyl iodide compound. Preferably, the acyl halide compound is an acyl chloride compound.

In one or more further embodiments, the acyl chloride compound is a compound as shown in Formula $R^5COCl$, in which $R^5$ is $C_1$-$C_{20}$ hydrocarbyl, or hydrogen, and can be a saturated or unsaturated straight, branched, or cyclic chain.

In the present invention, preferably, the acyl chloride compound is at least one selected from a group consisting of formyl chloride, acetyl chloride, propionyl chloride, butyryl chloride, benzoyl chloride, phthaloyl dichloride, phenylacetyl chloride, phenylpropionyl chloride, and phenylbutyryl chloride.

In one or more embodiments, the halogen and phosphorus-containing compound is a compound as shown in Formula $O_pPR^5_qX_{3-q}$, in which $R^5$ is $C_1$-$C_{20}$ alkyl or alkoxy, 0≤q<3, p=0 or 1, and X is halogen; or the halogen and phosphorus-containing compound is phosphorus pentachloride.

In the present invention, preferably, the halogen and phosphorus-containing compound is at least one selected from a group consisting of methyldichlorophosphine, ethyldichlorophosphine, butyldichlorophosphine, phosphorus trichloride, phosphorus pentachloride, phosphorus oxychloride, methyl dichlorophosphate, ethyl dichlorophosphate, and butyl dichlorophosphate; preferably the halogen and phosphorus-containing compound is selected from a group consisting of phosphorus trichloride, phosphorus pentachloride, and phosphorus oxychloride.

In one or more embodiments, the halogen and boron-containing compound is as shown in Formula $BR^5_qX_{3-q}$, in which $R^5$ is $C_1$-$C_{20}$ alkyl or alkoxy, 0≤q<3, and X is halogen.

In the present invention, preferably, the halogen and boron-containing, compound is at least one selected from a group consisting of methylboron dichloride, ethylboron dichloride, butylboron dichloride, methoxyboron dichloride, ethoxyboron dichloride, boron trichloride, and butoxyboron dichloride.

In one or more embodiments, the halogenated organic aluminium compound is a compound as shown in Formula $AlR^5_nX_{3-n}$, in which $R^5$ is $C_1$-$C_{20}$ hydrocarbyl, preferably being a straight or branched chain hydrocarbyl having no more than 6 carbon atoms, 0.5≤n≤2.5, and X is halogen.

In the present invention, preferably, the halogenated organic aluminium compound is at least one selected from a group consisting of ethyl aluminium dichloride, ethylaluminum sesquichloride, diethyl aluminium chloride, and isopropyl aluminium dichloride.

In one or more embodiments, the halogen and silicon-containing compound is a compound as shown in Formula $(R^5O)_q SiR^6_n X_{4-n-q}$, in which $R^5$ and $R^6$ are independently selected from $C_1$-$C_{20}$ hydrocarbyl or halogenated hydrocarbyl, and can be saturated or unsaturated straight, branched, or cyclic chain; each of q and n is 0 or a positive number, and $0 \leq q+n \leq 3$; X is halogen.

In the present invention, preferably, the halogen and silicon-containing compound is at least one selected from a group consisting of silicon tetrachloride, silicon tetrabromide, ethoxysilicon trichloride, phenylsilicon trichloride, methylsilicon trichloride, ethylsilicon trichloride, diethoxysilicon dichloride, methylmethoxysilicon dichloride, and methylphenoxysilicon dichloride; preferably the halogen and silicon-containing compound is at least one selected from a group consisting of silicon tetrachloride, silicon tetrabromide, ethoxysilicon trichloride, and phenylsilicon trichloride. In the steps of the preparation of the magnesium halide solution of the present invention, the temperature at which the magnesium compound, the organic epoxy compound the hydroxy-containing compound and the organic titanium compound are contacted with one another depends on properties of the reactant. Generally, it is advantageous to perform dissolving at a relatively high temperature, preferably below the decomposition temperature of the reactant, and the temperature is usually not more than 200° C., typically not more than 150° C. The time for dissolving depends on properties of the reactant and operation conditions. Generally, a time is selected as long as a completely transparent solution can be obtained. 10 minutes to 24 hours, preferably 2 hours to 16 hours, is typically required. The inert solvent as above can be added during dissolution.

The second step of the preparation of the catalyst component can also be called a precipitation step. In this step, the chlorination reaction of the magnesium-titanium complex solution is completed, to precipitate the liquid complex from the solution. Any known suitable method can be used to contact the magnesium-titanium solution with the halogen-containing compound. For example, the magnesium-titanium complex solution can be added dropwise into the halogen-containing compound solution, or the halogen-containing compound solution can be added dropwise into the magnesium-titanium solution. The dropping speed is selected on the premise that no local overheating of the reaction can occur. Stirring is often carried out during the dropping in order to facilitate the smooth conduct of the reaction. In this precipitation step, the temperature can be controlled in a range from −40° C. to 100° C., preferably from −20° C. to 80° C. The reaction time of the precipitation step should be sufficiently long so that a complete precipitate can be obtained. The reaction time can be in a range from 1 minute to 10 hours, preferably from 0.5 hours to 8 hours.

It is found that after the precipitation step, performing aging treatment at a certain temperature for a period of time is advantageous to the particle shape of the catalyst, and meanwhile can improve the strength of the catalyst particles, thus alleviating fragmentation of the catalyst particles during the process of ethylene polymerization in presence of the catalyst. The temperature for the aging treatment is generally equal to or higher than the temperature for the precipitation reaction. The time for the aging treatment can be controlled in 0.5-15 hours, preferably 1-10 hours.

After aging treatment, washing is typically performed, so as to remove excess amount of reactants and by products formed in the process of preparation. Any inert solvent, such as benzene, toluene, xylene, isobutylane, pentane, hexane, heptane, or cyclohexane or a mixture thereof, etc., can be used for washing. In experiments, hexane or toluene is commonly used as an inert solvent for washing. After washing, the suspension of the catalyst can be loaded with titanium directly for several times, or can be dried with nitrogen sweeping under heating condition, to obtain the catalyst powder directly.

The present invention also provides a catalyst for olefin polymerization, comprising a reaction product of the following components:

(a) the catalyst component prepared according to the above preparation method;

(b) at least one organic aluminium compound as shown in Formula $AlR_m X_{3-m}$, in which R is hydrogen or $C_1$-$C_{20}$ hydrocarbyl, X is halogen, and m is $0<m \leq 3$.

In the present invention, one or more than two organic aluminium compounds, preferably $AlEt_3$, $Al(iso-Bu)_3$, $Al(n-C_6H_{13})_3$, $Al(n-C_8H_{17})_3$, $AlEt_2Cl$, and the like, can be chosen to be used in combination.

In addition, the present invention further provides a magnesium halide solution system used for the preparation process of a catalyst component for olefin polymerization. The system comprises an oxygen-containing organic titanium compound, an organic epoxy compound, a hydroxy-containing compound, and an inert solvent, wherein the organic epoxy compound is a three membered epoxy compound as shown in Formula I,

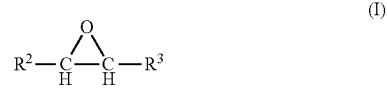

(I)

in Formula I, $R^2$ are $R^3$ are independently selected from H, or $C_1$-$C_{10}$ hydrocarbyl or halogenated hydrocarbyl, and can be saturated or unsaturated straight, branched, or cyclic chain; or the organic epoxy compound is a 4-8 membered epoxy compound.

According to the present invention, the magnesium halide solution system is a mixed solvent which is comprised of an oxygen-containing organic titanium compound, an organic epoxy compound, a hydroxy-containing compound and an inert solvent.

As described above, an existing solvent used for preparing olefin polymerization catalyst and an anhydrous magnesium halide can only form a suspension containing the magnesium halide. When used in olefin polymerization, a catalyst component prepared by using such a suspension containing the magnesium halide has a low polymerization activity, a relatively rapid rate of activity decay, and poor hydrogen response, which discourages long-term steady operation of polymerization plants.

As above described, through a large number of experiments, the inventor found that, a catalyst system suitable for olefin polymerization or copolymerization can be obtained by selecting a suitable magnesium halide system for dissolving and precipitating during the preparation of the catalyst. Such a catalyst system has a quite high activity of polymerization, stable polymerization dynamics, slow rate of activity decay, and good hydrogen response. The catalyst has good particle morphology and narrow particle size distribution, thus leading to good particle morphology, narrow particle size distribution, few fine powder, and large bulk density of the polymer. This is advantageous to the long-term steady operation of polymerization plants, and the polymer of olefin with three or more carbons has a very high stereoregularity. In addition, the synthesis of the catalyst has advantages such as low consumption of raw materials, high utilization rate of devices, easy operation, and being environmentally friendly.

In one or more embodiments of the present invention, the magnesium halide is as shown in Formula $MgX_2$, in which X is halogen; the oxygen-containing organic titanium compound is as shown in Formula $Ti(OR^1)_nX_{4-n}$, in which $R^1$ is $C_1$-$C_{20}$ hydrocarbyl, and can be a saturated or unsaturated straight, branched, or cyclic chain, $0<n\leq4$, and X is halogen; the hydroxy-containing compound is as shown in Formula $HOR^4$, in which $R^4$ is $C_1$-$C_{20}$ hydrocarbyl, and can be a saturated or unsaturated straight, branched, or cyclic chain; the inert solvent is $C_3$-$C_{100}$ aliphatic hydrocarbon or halogenated aliphatic hydrocarbon, aromatic hydrocarbon or halogenated aromatic hydrocarbon, and can be a saturated or unsaturated straight, branched, or cyclic chain; preferably, the inert solvent is a $C_4$-$C_{20}$ hydrocarbon.

In one or more embodiments, calculated based on per molar magnesium halide, the oxygen-containing organic titanium compound is 0.01-2.0 mol, preferably 0.1-1.5 mol; the organic epoxy compound is 0.01-10 mol, preferably 0.1-6.5 mol, the hydroxy-containing compound is 0.01-20 mol, preferably 0.1-15 mol.

As above, in the present invention, the mixed solvent does not contain a phosphate compound, so that an obtained magnesium halide solution can have a better performance in the downstream application. For example, when used in the preparation of catalyst, it enables the solid component to precipitate easily and enables the activity of the corresponding catalyst to be increased. Meanwhile, it can avoid remains of toxic phosphorus-containing substance in the downstream catalyst product. In the present invention, the phosphate compound is selected from tributyl phosphate, tributyl phosphate, tripropyl phosphate, triethyl phosphate, or trimethyl phosphate.

Preferably, the mixed solvent of the present invention only comprises the four indispensible organic solvents, i.e. the oxygen-containing organic titanium compound, the organic epoxy compound, the hydroxy-containing compound, and the inert solvent.

In the present invention, "phosphate compound", i.e. organic phosphorus compound, is an ester derivative of phosphoric acid, and is a derivative of phosphoric acid. Since phosphoric acid is a ternary acid, according to the number of the substituted hydrocarbyl, phosphates can be classified into primary phosphates (mono-organic phosphate, hydrocarbyl phosphate), secondary phosphates (phosphodiester), and tertiary phosphates (phosphotriester).

In the present invention, "titanate compound" refers to a titanium-containing compound which has a hydrocarbyloxy, such as tetrabutyl titanate, tetraethyl titanate and the like.

In the present invention, "phenol" i.e. a phenol compound is an aromatic compound as shown in Formula ArOH, on which at least one hydrogen on the aromatic ring is substituted by hydroxyl (—OH).

In the present invention, "hydrogen" refers to a compound formed by carbon atoms and hydrogen atoms, and it comprises alkane, cycloalkane, alkene, alkyne, and aromatic hydrocarbon.

In the present invention, "ester" refers to a product formed by an esterification reaction of an alcohol with a carboxylic acid or an inorganic oxacid. In addition to carboxylic ester, the ester compound comprises an ester of the inorganic oxacid such as nitric acid, sulphuric acid and so on.

In the present invention, "ketone" refers to an organic compound as shown in Formula $RC(=O)R'$, in which R and R' may be atoms or functional groups identical to or different from each other, and it has a carbonyl($C=O$) bonded with two carbon atoms.

In the present invention, term "amine" refers to an organic compound, which is formed after a hydrogen of ammonia molecule ($NH_3$) is substituted by a hydrocarbyl group.

In the present invention, "ethylaluminum sesquichloride", also known as triethyldialuminium trichloride, has a molecular formula of $C_6H_{15}Al_2Cl_3$.

In the present invention, "magnesium halide solution system" refers to a mixed solvent used for dissolving a magnesium halide or anhydrous magnesium halide during preparation of the catalyst for olefin polymerization. The mixed solvent comprising several components, for example, an oxygen-containing organic titanium compound, an organic epoxy compound, a hydroxy-containing compound, and an inert solvent, preferably a mixed solvent used for dissolving a anhydrous magnesium halide, the mixed solvent comprising an oxygen-containing organic titanium compound, an organic epoxy compound, a hydroxy-containing compound, and an inert solvent.

The catalyst component or catalyst involved in the present invention is suitable for polymerization or copolymerization of varieties of olefins, preferably for homo polymerization or copolymerization of ethylene, propene, butane, hexane and octene, especially homo polymerization of ethylene or copolymerization of ethylene with other α-olefins, wherein α-olefin is one selected from propene, butane, pentene, hexane, octane, and 4-methyl pentene-1.

DETAILED DESCRIPTION OF THE EMBODIMENTS

Measuring Methods

1. Particle size distribution of carriers and catalysts; measured by MASTERSIZE particle size analyzer with n-hexane as dispersant, and the measuring scope being 0.02-2000 μm.

2. Weight percentage of metals (mainly titanium and magnesium) in a catalyst: measured using an ICP plasma spectrometer.

3. Melt index; measured based on ASTMD1238 standard.

4. Bulk density: measured based on DIN-53194 standard.

The embodiments below are provided for illustrating, rather than restricting the present invention.

EXAMPLES

In the following Examples 1 to 5, a solution of magnesium halide was first prepared. The solution of magnesium halide was then mixed with a halogen and titanium-containing compound to precipitate a solid, thus obtaining a catalyst component.

Example 1

Preparation of a Catalyst Component:

2.4 g of anhydrous magnesium chloride was measured, followed by addition of 8.8 mL of tetrabutyl titanate, 2.0 mL of epoxy chloropropane, 2.2 mL of anhydrous ethanol, and 50 mL of methylbenzene. The resulting mixture was kept at 60° C. and stirred until a transparent solution was obtained. 100 mL of methylbenzene was again added. The solution was cooled to −20° C., followed by slow drop wise addition of 30 mL of titanium tetrachloride from a burette. After that, the solution was kept at −20° C. and reacted for 0.5 hour, then heated to 50° C. and reacted for 4 hours, and finally heated to 90° C. and reacted for 3 hours, to obtain a suspension liquid of catalyst. The suspension liquid of catalyst was left standing undisturbed for settling, and washed for four times with 50 mL of methylbenzene each time, and washed twice with 50 mL of hexane each time. After washing, the liquid was dried with nitrogen sweeping under 65° C. bath condition, to obtain a solid white free-flowing power. The solid white free-flowing power was the catalyst component according to the present invention, and the average particle size thereof was 3.48 µm. Elemental Analysis: Ti: 9.82% (by weight), Mg: 15.42% (by weight).

Evaluation of Catalyst:

1 L of hexane, 1 mmol of triethyl aluminum, and a certain amount of catalyst were placed into a 2 L stainless agitated reactor, and then heated to 80° C. followed by addition of 0.18 MPa of hydrogen gas. The total pressure of the system was maintained at 0.73 MPa with ethylene to run a polymerization reaction. After a 2 hour polymerization reaction, addition of ethylene was stopped, followed by cooling, pressure releasing, weighing of polyethylene powder, calculating of catalyst activity, measuring of bulk density (BD) of the polyethylene powder and melt index ($MI_{2.16}$) of the polyethylene powder under a load of 2.16 Kg. Results were shown in Table 1.

Example 2

Preparation of a Catalyst Component:

Conditions used in the present example were the same as those used in example 1, except that the step "the solution was cooled to −20° C." in example 1 was amended into "the solution was cooled to 0° C.", the step "the solution was kept at −20° C. and reacted for 0.5 hour" was amended into "the solution was kept at 0° C. and reacted for 0.5 hour", and the step "followed by slow drop wise addition of 30 mL of titanium tetrachloride from a burette" was amended into "followed by slow drop wise addition of 15 mL of titanium tetrachloride from a burette". The average particle size of the obtained catalyst was 8.65 µm. Elemental Analysis (ICP): Ti: 6.75% (by weight), Mg: 19.71% (by weight).

Evaluation of Catalyst:

Slurry polymerization conditions of the catalyst were the same as those in example 1. Results were shown in Table 1.

Example 3

Preparation of a Catalyst Component:

Conditions used in the present example were the same as those used in example 1, except that "2.2 mL of anhydrous ethanol" in example 1 was changed into "11.8 mL of isooctanol". The average particle size of the obtained catalyst was 3.92 µm. Elemental Analysis (ICP): Ti: 27.61% (by weight), Mg: 10.10% (by weight).

Evaluation of Catalyst:

Slurry polymerization conditions of the catalyst were the same as those in example 1. Results were shown in Table 1.

Example 4

Preparation of a Catalyst Component:

Conditions used in the present example were the same as those used in example 1, except that "2.2 mL of anhydrous ethanol" in example 1 was changed into "6.9 mL of n-butyl alcohol". The average particle size of the obtained catalyst was 2.82 µm. Elemental Analysis (ICP): Ti: 6.69% (by weight), Mg: 19.8% (by weight).

Evaluation of Catalyst:

Slurry polymerization conditions of the catalyst were the same as those in example 1. Results were shown in Table 1.

Example 5

Preparation of a Catalyst Component:

Conditions used in the present example were the same as those used in example 1, except that "8.8 mL of tetrabutyl titanate" in example 1 was changed into "5.5 mL of tetraethyl titanate", and "2.0 mL of epoxy chloropropane" was changed into "2.1 mL of tetrahydrofuran". The average particle size of the obtained catalyst was 7.64 µm. Elemental Analysis (ICP): Ti: 12.22% (by weight), Mg: 16.06% (by weight).

Evaluation of Catalyst:

Slurry polymerization conditions of the catalyst were the same as those in example 1. Results were shown in Table 1.

TABLE 1

| | Activity (kgPE/g cat) | $MI_{2.16}$ (g/10 min) | BD (g/ml) |
|---|---|---|---|
| Example 1 | 41.3 | 0.41 | 0.34 |
| Example 2 | 23.8 | 0.62 | 0.33 |
| Example 3 | 13.6 | 0.18 | 0.32 |
| Example 4 | 37.3 | 0.29 | 0.33 |
| Example 5 | 40.4 | 0.72 | 0.32 |

In the following Examples 6 to 9, a solution of magnesium halide was first prepared. The solution of magnesium halide was then mixed with a halogenated organic hydrocarbon compound to precipitate a solid, thus obtaining a catalyst component.

Example 6

Preparation of a catalyst component;

2.4 g of anhydrous magnesium chloride was measured, followed by addition of 8.8 mL of tetrabutyl titanate, 2.0 mL of epoxy chloropropane, 2.2 mL of anhydrous ethanol, and 50 mL of methylbenzene. The resulting mixture was kept at 60° C. and stirred until a transparent solution was obtained. 100 mL of methylbenzene was again added. The solution was cooled to 0° C., followed by slow drop wise addition of 25 mL of chloro-t-butane, from a burette. After that, the solution was kept at 0° C. and reacted for 0.5 hour, then heated to 50° C. and reacted for 3 hours, and finally heated to 90° C. and reacted for 2 hours, to obtain a suspension liquid of catalyst. The suspension liquid of catalyst was left standing undisturbed for settling, washed for four times with 50 mL of methylbenzene each time, and washed twice with 50 mL of hexane each time. After washing, the liquid was dried with nitrogen sweeping under 65° C. bath condition, to obtain a solid white free-flowing power. The solid white free-flowing power was the catalyst component according to the present invention, and the average particle size thereof was 33.72 µm. Elemental Analysis: Ti: 15.24% (by weight), Mg: 16.74% (by weight).

Evaluation of Catalyst:

1 L of hexane, 1 mmol of triethyl aluminum, and a certain amount of catalyst were placed into a 2 L stainless agitated reactor, and then heated to 85° C., followed by addition of 0.18 MPa of hydrogen gas. The total pressure of the system was maintained at 1.03 MPa with ethylene to run a polymerization reaction. After a 2 hour polymerization reaction, addition of ethylene was stopped, followed by cooling, pressure releasing, weighing of polyethylene powder, calculating of catalyst activity, measuring of bulk density (BD) of the polyethylene powder and melt index ($MI_{2.16}$) of the polyethylene powder under a load of 2.16 Kg. Results were shown in Table 2.

Example 7

Preparation of a Catalyst Component:

Conditions used in the present example were the same as those used in example 6, except that the step "the solution was cooled to 0° C." in example 6 was amended into "the solution was cooled to 45° C.", and the step "the solution was kept at 0° C. and reacted for 0.5 hour" was amended into "the solution was kept at 45° C. and reacted for 0.5 hour". The average particle size of the obtained catalyst was 24.52 µm. Elemental Analysis (ICP): Ti: 8.33% (by weight), Mg: 14.17% (by weight).

Evaluation of Catalyst:

Slurry polymerization conditions of the catalyst were the same as those in example 6. Results were shown in Table 2.

Example 8

Preparation of a Catalyst Component:

Conditions used in the present example were the same as those used in example 6, except that "8.8 mL of tetrabutyl titanate" in example 6 was changed into "5.5 mL of tetraethyl titanate". The average particle size of the obtained catalyst was 41.29 µm. Elemental Analysis (ICP): Ti: 6.53% (by weight), Mg: 12.20% (by weight).

Evaluation of Catalyst:

Slurry polymerization conditions of the catalyst were the same as those in example 6. Results were shown in Table 2.

Example 9

Preparation of a Catalyst Component:

Conditions used in the present example were the same as those used in example 6, except that "2.2 ml, of anhydrous ethanol" in example 6 was changed into "6.9 mL of n-butyl alcohol". The average particle size of the obtained catalyst was 28.07 µm. Elemental Analysis (ICP): Ti: 4.88% (by weight), Mg: 13.59% (by weight).

Evaluation of Catalyst:

Slurry polymerization conditions of the catalyst were the same as those in example 6. Results were shown in Table 2.

TABLE 2

|  | Activity (kgPE/g cat) | $MI_{2.16}$ (g/10 min) | BD (g/ml) |
| --- | --- | --- | --- |
| Example 6 | 3.65 | 0.68 | 0.32 |
| Example 7 | 5.63 | 0.81 | 0.34 |
| Example 8 | 3.08 | 0.52 | 0.30 |
| Example 9 | 2.67 | 0.93 | 0.31 |

In the following Examples 10 to 13, a solution of magnesium halide was first prepared. The solution of magnesium halide was then mixed with an acyl chloride compound to precipitate a solid, thus obtaining a catalyst component.

Example 10

Preparation of a Catalyst Component:

2.4 g of anhydrous magnesium chloride was measured, followed by addition of 8.8 mL of tetrabutyl titanate, 2.0 mL of epoxy chloropropane, 2.2 mL of anhydrous ethanol, and 50 mL of methylbenzene. The resulting mixture was kept at 60° C. and stirred until a transparent solution was obtained. 100 mL of methylbenzene was again added. The solution was cooled to 0° C., followed by slow drop wise addition of 27 mL of benzoyl chloride from a burette. After that, the solution was kept at 0° C. and reacted for 0.5 hour, then heated to 50° C. and reacted for 3 hours, and finally heated to 90° C. and reacted for 2 hours, to obtain a suspension liquid of catalyst. The suspension liquid of catalyst was left standing undisturbed for settling, washed for four times with 50 mL of methylbenzene each time, and washed twice with 50 mL of hexane each time. After washing, the liquid was dried with nitrogen sweeping under 65° C. bath condition, to obtain a solid white free-flowing power. The solid white free-flowing power was the catalyst component according to the present invention, and the average particle size thereof was 35.63 µm. Elemental Analysis: Ti: 16.37% (by weight), Mg: 13.16% (by weight).

Evaluation of Catalyst:

1 L of hexane, 1 mmol of triethyl aluminum, and a certain amount of catalyst were placed into a 2 L stainless agitated reactor, and then heated to 85° C., followed by addition of 0.18 MPa of hydrogen gas. The total pressure of the system was maintained at 1.03 MPa with ethylene to run a polymerization reaction. After a 2 hour polymerization reaction, addition of ethylene was stopped, followed by cooling, pressure releasing, weighing of polyethylene powder, calculating of catalyst activity, measuring of bulk density (BD) of the polyethylene powder and melt index ($MI_{2.16}$) of the polyethylene powder under a load of 2.16 Kg. Results were shown in Table 3.

Example 11

Preparation of a Catalyst Component:

Conditions used in the present example were the same as those used in example 10, except that the step "the solution was cooled to 0° C." in example 10 was amended into "the solution was cooled to 45° C.", and the step "the solution was kept at 0° C. and reacted for 0.5 hour" was amended into "the solution was kept at 45° C. and reacted for 0.5 hour". The average particle size of the obtained catalyst was 23.54 µm. Elemental Analysis (ICP): Ti: 9.86% (by weight), Mg: 18.25% (by weight).

Evaluation of Catalyst:

Slurry polymerization conditions of the catalyst were the same as those in example 10. Results were shown in Table 3.

Example 12

Preparation of a Catalyst Component;

Conditions used in the present example were the same as those used in example 10, except that "27 mL of benzoyl chloride" in example 10 was changed into "14 mL of benzoyl chloride". The average particle size of the obtained catalyst was 38.18 µm. Elemental Analysis (ICP): Ti: 15.27% (by weight), Mg: 12.47% (by weight).

Evaluation of Catalyst:

Slurry polymerization conditions of the catalyst were the same as those in example 10. Results were shown in Table 3.

Example 13

Preparation of a Catalyst Component:

Conditions used in the present example were the same as those used in example 10, except that "2.2 mL of anhydrous ethanol" in example 10 was changed into "6.9 mL of n-butyl alcohol". The average particle size of the obtained catalyst was 42.45 μm. Elemental Analysis (ICP): Ti: 11.15% (by weight), Mg: 13.62% (by weight).

Evaluation of Catalyst:

Slurry polymerization conditions of the catalyst were the same as those in example 10. Results were shown in Table 3.

TABLE 3

|  | Activity (kgPE/g cat) | $MI_{2.16}$ (g/10 min) | BD (g/ml) |
|---|---|---|---|
| Example 10 | 6.72 | 1.24 | 0.33 |
| Example 11 | 8.26 | 0.83 | 0.35 |
| Example 12 | 4.13 | 1.34 | 0.32 |
| Example 13 | 5.21 | 0.96 | 0.34 |

In the following Examples 14 to 17, a solution of magnesium halide was first prepared. The solution of magnesium halide was then mixed with a halogen and phosphorus-containing compound to precipitate a solid, thus obtaining a catalyst component.

Example 14

Preparation of a Catalyst Component:

2.4 g of anhydrous magnesium chloride was measured, followed by addition of 8.8 mL, of tetrabutyl titanate, 2.0 mL of epoxy chloropropane, 2.2 mL of anhydrous ethanol, and 50 mL of methylbenzene. The resulting mixture was kept at 60° C. and stirred until a transparent solution was obtained. 100 mL of methylbenzene was again added. The solution was cooled to 0° C., followed by slow drop wise addition of 35 mL of phosphorus trichloride from a burette. After that, the solution was kept at 0° C. and reacted for 0.5 hour, then heated to 50° C. and reacted for 3 hours, and finally heated to 90° C. and reacted for 2 hours, to obtain a suspension liquid of catalyst. The suspension liquid of catalyst was left standing undisturbed for settling, washed for four times with 50 mL of methylbenzene each time, and washed twice with 50 mL of hexane each time. After washing, the liquid was dried with nitrogen sweeping under 65° C. bath condition, to obtain a solid white free-flowing power. The solid white free-flowing power was the catalyst component according to the present invention, and the average particle size thereof was 16.7 μm. Elemental Analysis: Ti: 0.54% (by weight), Mg: 26.39% (by weight).

Evaluation of Catalyst:

1 L of hexane, 1 mmol of triethyl aluminum, and a certain amount of catalyst were placed into a 2 L stainless agitated reactor, and then heated to 80° C., followed by addition of 0.18 MPa of hydrogen. The total pressure of the system was maintained at 0.73 MPa with ethylene to run a polymerization reaction. After a 2 hour polymerization reaction, addition of ethylene was stopped, followed by cooling, pressure releasing, weighing of polyethylene powder, calculating of catalyst activity, measuring of bulk density (BD) of the polyethylene powder and melt index (MI2.16) of the polyethylene powder under a load of 2.16 Kg. Results were shown in Table 4.

Example 15

Preparation of a Catalyst Component:

Conditions used in the present example were the same as those used in example 14, except that the step "the solution was cooled to 0° C." in example 14 was amended into "the solution was cooled to 45° C.", and the step "the solution was kept at 0° C. and reacted for 0.5 hour" was amended into "the solution was kept at 45° C. and reacted for 0.5 hour". The average particle size of the obtained catalyst was 33.56 μm. Elemental Analysis (ICP): Ti: 0.67% (by weight), Mg: 25.34% (by weight).

Evaluation of Catalyst:

Slurry polymerization conditions of the catalyst were the same as those in example 14. Results were shown in Table 4.

Example 16

Preparation of a Catalyst Component:

Conditions used in the present example were the same as those used in example 14, except that "8.8 mL of tetrabutyl titanate" in example 14 was changed into "5.5 mL of tetraethyl titanate". The average particle size of the obtained catalyst was 21.46 μm. Elemental Analysis (ICP): Ti: 0.86% (by weight), Mg: 20.5% (by weight).

Evaluation of Catalyst:

Slurry polymerization conditions of the catalyst were the same as those in example 14. Results were shown in Table 4.

Example 17

Preparation of a Catalyst Component:

Conditions used in the present example were the same as those used in example 14, except that "2.2 mL of anhydrous ethanol" in example 14 was changed into "4.6 mL of n-butyl alcohol", and that the step "the solution was cooled to 0° C." in example 14 was amended into "the solution was cooled to 45° C.", and the step "the solution was kept at 0° C. and reacted for 0.5 hour" was amended into "the solution was kept at 45° C. and reacted for 0.5 hour". The average particle size of the obtained catalyst was 26.35 μm. Elemental Analysis (ICP): Ti: 0.97% (by weight), Mg: 28.82% (by weight).

Evaluation of Catalyst:

Slurry polymerization conditions of the catalyst were the same as those in example 14. Results were shown in Table 4.

TABLE 4

|  | Activity (kgPE/g cat) | $MI_{2.16}$ (g/10 min) | BD (g/ml) |
|---|---|---|---|
| Example 14 | 6.2 | 0.76 | 0.35 |
| Example 15 | 4.7 | 0.62 | 0.34 |
| Example 16 | 3.9 | 0.57 | 0.34 |
| Example 17 | 5.7 | 0.61 | 0.36 |

In the following Examples 18 to 21, a solution of magnesium halide was first prepared. The solution of magnesium halide was then mixed with a halogen and boron-containing compound to precipitate a solid, thus obtaining a catalyst component.

Example 18

Preparation of a Catalyst Component:

2.4 g of anhydrous magnesium chloride was measured, followed by addition of 8.8 mL of tetrabutyl titanate, 2.0 mL of epoxy chloropropane, 2.2 mL of anhydrous ethanol, and 50 mL of methylbenzene. The resulting mixture was kept at 60° C. and stirred until a transparent solution was obtained. 100 mL of methylbenzene was again added. The solution was cooled to 0° C., followed by slow drop wise addition of 50 mL of hexane solution of boron trichloride (1M) from a burette. After that, the solution was kept at 0° C. and reacted for 0.5 hour, then heated to 50° C. and reacted for 3 hours, and finally heated to 65° C. and reacted for 2 hours, to obtain a suspension liquid of catalyst. The suspension liquid of catalyst was left standing undisturbed for settling, washed for four times with 50 mL of methylbenzene each time, and washed twice with 50 mL of hexane each time. After washing, the liquid was dried with nitrogen sweeping under 65° C. bath condition, to obtain a solid white free-flowing power. The solid white free-flowing power was the catalyst component according to the present invention, and the average particle size thereof was 25.57 µm. Elemental Analysis: Ti: 1.36% (by weight), Mg: 27.86% (by weight).

Evaluation of Catalyst:

1 L of hexane, 1 mmol of triethyl aluminum, and a certain amount of catalyst were placed into a 2 L stainless agitated reactor, and then heated to 80° C., followed by addition of 0.18 MPa of hydrogen gas. The total pressure of the system was maintained at 0.73 MPa with ethylene to run a polymerization reaction. After a 2 hour polymerization reaction, addition of ethylene was stopped, followed by cooling, pressure releasing, weighing of polyethylene powder, calculating of catalyst activity, measuring of bulk density (BD) of the polyethylene powder and melt index (MI2.16) of the polyethylene powder under a load of 2.16 Kg. Results were shown in Table 5.

Example 19

Preparation of a Catalyst Component:

Conditions used in the present example were the same as those used in example 18, except that the step "the solution was cooled to 0° C." in example 18 was amended into "the solution was cooled to 30° C.", and the step "the solution was kept at 0° C. and reacted for 0.5 hour" was amended into "the solution was kept at 30° C. and reacted for 0.5 hour". The average particle size of the obtained catalyst was 18.47 µm. Elemental Analysis (ICP): 1.54% (by weight), Mg: 27.95% (by weight).

Evaluation of Catalyst:

Slurry polymerization conditions of the catalyst were the same as those in example 18. Results were shown in Table 5.

Example 20

Preparation of a Catalyst Component:

Conditions used in the present example were the same as those used in example 18, except that "2.0 mL of epoxy chloropropane" in example 18 was changed into "2.1 mL of tetrahydrofuran". The average particle size of the obtained catalyst was 31.29 µm. Elemental Analysis (ICP): Ti: 0.92% (by weight), Mg: 22.16% (by weight).

Evaluation of Catalyst:

Slurry polymerization conditions of the catalyst were the same as those in example 18 Results were shown in Table 5.

Example 21

Preparation of a Catalyst Component:

Conditions used in the present example were the same as those used in example 18, except that "2.2 mL of anhydrous ethanol" in example 18 was changed into "4.6 mL of n-butyl alcohol". The average particle size of the obtained catalyst was 20.85 µm. Elemental Analysis (ICP): Ti: 0.76% (by weight), Mg: 21.65% (by weight).

Evaluation of Catalyst:

Slurry polymerization conditions of the catalyst were the same as those in example 18. Results were shown in Table 5.

TABLE 5

| | Activity (kgPE/g cat) | $MI_{2.16}$ (g/10 min) | BD (g/ml) |
|---|---|---|---|
| Example 18 | 22.1 | 0.41 | 0.33 |
| Example 19 | 24.8 | 0.35 | 0.34 |
| Example 20 | 18.6 | 0.53 | 0.36 |
| Example 21 | 16.5 | 0.73 | 0.34 |

In the following Examples 22 to 25, a solution of magnesium halide was first prepared. The solution of magnesium halide was then mixed with a halogenated organic aluminium compound to precipitate a solid, thus obtaining a catalyst component.

Example 22

Preparation of a Catalyst Component:

1.2 g of anhydrous magnesium chloride was measured, followed by addition of 4.4 mL of tetrabutyl titanate, 1.0 mL of epoxy chloropropane, 1.1 mL of anhydrous ethanol, and 50 mL of hexane. The resulting mixture was kept at 60° C. and stirred until a transparent solution was obtained. 100 mL of hexane was again added. The solution was cooled to 0° C., followed by slow drop wise addition of 18 mL of hexane solution of ethyl aluminium dichloride (3M) from a burette. After that, the solution was kept at 0° C. and reacted for 0.5 hour, and then heated to 65° C. and reacted for 3 hours, to obtain a suspension liquid of catalyst. The suspension liquid of catalyst was left standing undisturbed for settling, and washed for four times with 50 mL of hexane each time. After washing, the liquid was dried with nitrogen sweeping under 65° C. bath condition, to obtain a free-flowing power. The free-flowing power was the catalyst component according to the present invention, and the average particle size thereof was 15.68 µm. Elemental Analysis: Ti: 11.48% (by weight), Mg: 13.78% (by weight).

Evaluation of Catalyst:

1 L of hexane, 1 mmol of triethyl aluminum, and a certain amount of catalyst were placed into a 2 L stainless agitated reactor, and then heated to 90° C., followed by addition of 0.4 MPa of hydrogen. The total pressure of the system was maintained at 1.0 MPa with ethylene to run a polymerization reaction. After a 2 hour polymerization reaction, addition of ethylene was stopped, followed by cooling, pressure releasing, weighing of polyethylene powder, calculating of catalyst activity, measuring of bulk density (BD) of the polyethylene powder and melt index (MI2.16) of the polyethylene powder under a load of 2.16 Kg. Results were shown in Table 6.

Example 23

Preparation of a Catalyst Component:

Conditions used in the present example were the same as those used in example 22, except that the step "the solution was cooled to 0° C." in example 22 was amended into "the solution was cooled to 45° C.", and the step "the solution was kept at 0° C., and reacted for 0.5 hour" was amended into "the solution was kept at 45° C. and reacted for 0.5 hour". The average particle size of the obtained catalyst was 14.77 μm. Elemental Analysis (ICP); Ti: 7.64% (by weight), Mg; 16.06% (by weight).

Evaluation of Catalyst:

Slurry polymerization conditions of the catalyst were the same as those in is example 22. Results were shown in Table 6.

Example 24

Preparation of a Catalyst Component:

Conditions used in the present example were the same as those used in example 22, except that "4.4 mL of tetrabutyl titanate" in example 22 was changed into "2.8 mL of tetraethyl titanate". The average particle size of the obtained catalyst was 21.64 μm. Elemental Analysis (ICP); Ti: 10.92% (by weight), Mg: 16.33% (by weight).

Evaluation of Catalyst:

Slurry polymerization conditions of the catalyst were the same as those in example 22. Results were shown in Table 6.

Example 25

Preparation of a Catalyst Component:

Conditions used in the present example were the same as those used in example 22, except that "1.1 mL of anhydrous ethanol" in example 22 was changed into "2.3 mL of n-butyl alcohol", and that the step "the solution was cooled to 0° C." in example 22 was amended into "the solution was cooled to 45° C.", and the step "the solution was kept at 0° C., and reacted for 0.5 hour" was amended into "the solution was kept at 45° C. and reacted for 0.5 hour". The average particle size of the obtained catalyst was 16.84 μm. Elemental Analysis (ICP): Ti: 8.19% (by weight), Mg: 12.57% (by weight).

Evaluation of Catalyst:

Slurry polymerization conditions of the catalyst were the same as those in example 22. Results were shown in Table 6.

TABLE 6

|  | Activity (kgPE/g cat) | $MI_{2.16}$ (g/10 min) | BD (g/ml) |
|---|---|---|---|
| Example 22 | 12.7 | 63.6 | 0.36 |
| Example 23 | 11.2 | 19.2 | 0.34 |
| Example 24 | 15.8 | 18.7 | 0.32 |
| Example 25 | 27.1 | 21.5 | 0.34 |

In the following Examples 26 to 29, a solution of magnesium halide was first prepared. The solution of magnesium halide was then mixed with a halogen and silicon-containing compound to precipitate a solid, thus obtaining a catalyst component.

Example 26

Preparation of a Catalyst Component:

2.4 g of anhydrous magnesium chloride was measured, followed by addition of 8.8 mL of tetrabutyl titanate, 2.0 mL of epoxy chloropropane, 2.2 mL of anhydrous ethanol, and 50 mL of methylbenzene. The resulting mixture was kept at 60° C. and stirred until a transparent solution was obtained. 100 mL of methylbenzene was again added. The solution was cooled to 0° C., followed by slow drop wise addition of 30 mL of silicon tetrachloride from a burette. After that, the solution was kept at 0° C. and reacted for 0.5 hour, then heated to 50° C. and reacted for 3 hours, and finally heated to 90° C. and reacted for 2 hours, to obtain a suspension liquid of catalyst. The suspension liquid of catalyst was left standing undisturbed for settling, washed for four times with 50 mL of methylbenzene each time, and washed twice with 50 mL of hexane each time. After washing, the liquid was dried with nitrogen sweeping under 65° C. bath condition, to obtain a solid white free-flowing power. The solid white free-flowing power was the catalyst component according to the present invention, and the average particle size thereof was 23.66 μm. Elemental Analysis: Ti: 0.70% (by weight), Mg: 19.71% (by weight).

Evaluation of Catalyst:

1 L of hexane, 1 mmol of triethyl aluminum, and a certain amount of catalyst were placed into a 2 L stainless agitated reactor, and then heated to 85° C., followed by addition of 0.18 MPa of hydrogen. The total pressure of the system was maintained at 1.03 MPa with ethylene to run a polymerization reaction. After a 2 hour polymerization reaction, addition of ethylene was stopped, followed by cooling, pressure releasing, weighing of polyethylene powder, calculating of catalyst activity, measuring of bulk density (BD) of the polyethylene powder and melt index (MI2.16) of the polyethylene powder under a load of 2.16 Kg. Results were shown in Table 7.

Example 27

Preparation of a Catalyst Component:

Conditions used in the present example were the same as those used in example 26, except that the step "the solution was cooled to 0° C." in example 26 was amended into "the solution was cooled to 25° C.", and the step "the solution was kept at 0° C. and reacted for 0.5 hour" was amended into "the solution was kept at 25° C. and reacted for 0.5 hour". The average particle size of the obtained catalyst was 13.78 μm. Elemental Analysis (ICP): Ti: 0.86% (by weight), Mg: 20.50% (by weight).

Evaluation of Catalyst:

Slurry polymerization conditions of the catalyst were the same as those in example 26. Results were shown in Table 7.

Example 28

Preparation of a Catalyst Component:

Conditions used in the present example were the same as those used in example 26, except that "2.0 mL of epoxy chloropropane" in example 26 was changed into "2.1 mL of tetrahydrofuran", and that the step "the solution was cooled to 0° C." in example 26 was amended into "the solution was cooled to 25° C.", and the step "the solution was kept at 0° C. and reacted for 0.5 hour" was amended into "the solution was kept at 25° C. and reacted for 0.5 hour". The average particle size of the obtained catalyst was 21.61 μm. Elemental Analysis (ICP): Ti: 0.60% (by weight), Mg: 22.91% (by weight).

Evaluation of Catalyst:

Slurry polymerization conditions of the catalyst were the same as those in example 26. Results were shown in Table 7.

Example 29

Preparation of a Catalyst Component:

Conditions used in the present example were the same as those used in example 26, except that "8.8 mL of tetrabutyl titanate" in example 26 was changed into "5.5 mL, of tetraethyl titanate", and that the step "the solution was cooled to 0° C." in example 26 was amended into "the solution was cooled to 25° C.", and the step "the solution was kept at 0° C. and reacted for 0.5 hour" was amended into "the solution was kept at 25° C. and reacted for 0.5 hour". The average particle size of the obtained catalyst was 16.29 μm. Elemental Analysis (ICP): Ti: 0.36% (by weight), Mg: 19.03% (by weight).

Evaluation of Catalyst:

Slurry polymerization conditions of the catalyst were the same as those in example 26. Results were shown in Table 7.

TABLE 7

|  | Activity (kgPE/g cat) | $MI_{2.16}$ (g/10 min) | BD (g/ml) |
| --- | --- | --- | --- |
| Example 26 | 22.6 | 0.49 | 0.38 |
| Example 27 | 37.4 | 0.24 | 0.41 |
| Example 28 | 17.7 | 0.33 | 0.39 |
| Example 29 | 12.6 | 0.32 | 0.39 |

The above embodiments are merely preferred embodiments of the present invention, and are not provided for restricting the present invention. Any amendments, equivalent substitutions, or improvements can be made to the present invention within the spirit and based on the principles of the present invention.

The invention claimed is:

1. A catalyst component for olefin polymerization, which is obtained by mixing a magnesium halide solution containing an organic epoxy compound with a halogen-containing compound to precipitate a solid;

wherein, the organic epoxy compound is a three membered epoxy compound as shown in Formula I,

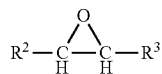

(I)

wherein, $R^2$ are $R^3$ are independently selected from H, or $C_1$-$C_{10}$ hydrocarbyl or halogenated hydrocarbyl, and can be a saturated or unsaturated straight, branched, or cyclic chain; or the organic epoxy compound is a 4-8 membered epoxy compound;

the halogen-containing compound comprises at least one selected from the group consisting of acyl halide compounds and halogen and silicon-containing compounds;

the halogen and silicon-containing compound contains at least one silicon-halogen bond; and the magnesium halide solution is formed by dissolving an anhydrous magnesium halide into a mixed solvent which comprises an oxygen-containing organic titanium compound, the organic epoxy compound, a hydroxy-containing compound, and an inert solvent, and does not comprise a phosphate or a phosphite compound.

2. The catalyst component according to claim 1, wherein the magnesium halide solution is formed by dissolving the anhydrous magnesium halide into a mixed solvent which is comprised of the oxygen-containing organic titanium compound, the organic epoxy compound, the hydroxy-containing compound, and the inert solvent.

3. The catalyst component according to claim 1, wherein the magnesium halide is as shown in Formula $MgX_2$, in which X is halogen; the oxygen-containing organic titanium compound is as shown in Formula $Ti(OR^1)_nX_{4-n}$, in which $R^1$ is $C_1$-$C_{20}$ hydrocarbyl, and can be a saturated or unsaturated straight, branched, or cyclic chain, $0<n\leq4$, and X is halogen; the hydroxy-containing compound is as shown in Formula $HOR^4$, in which $R^4$ is $C_1$-$C_{20}$ hydrocarbyl, and can be a saturated or unsaturated straight, branched, or cyclic chain; the inert solvent is $C_3$-$C_{100}$ aliphatic hydrocarbon or halogenated aliphatic hydrocarbon, aromatic hydrocarbon or halogenated aromatic hydrocarbon, and can be a saturated or unsaturated straight, branched, or cyclic chain.

4. The catalyst component according to claim 1, wherein the magnesium halide is selected from the group consisting of magnesium chloride, magnesium bromide, magnesium iodide and mixtures thereof; the oxygen-containing organic titanium compound is selected from the group consisting of titanate compounds and mixtures thereof; the hydroxy-containing compound is selected from the group consisting of aliphatic alcohols, aromatic alcohols, and phenols; the inert solvent is selected from the group consisting of benzene, toluene, xylene, n-butane, isobutane, isopentane, pentane, n-hexane, cyclohexane, heptane, octane, decane, 1,2-dichloroethane, chlorobenzene and mixtures thereof.

5. The catalyst component according to claim 1, wherein calculated based on per molar magnesium halide, the oxygen-containing organic titanium compound is 0.01-2.0 mol; the organic epoxy compound is 0.01-10 mol; the hydroxy-containing compound is 0.01-20 mol; the halogen-containing compound is 0.1-100 mol.

6. The catalyst component according to claim 1, wherein the organic epoxy compound is one or more selected from the group consisting of ethylene oxide, propylene oxide, butylenes oxide, butadiene oxide, butadiene dioxide, epoxy chloropropane, methyl glycidyl ether, diglycidyl ether, and terahydrofuran.

7. The catalyst component according to claim 1, wherein the acyl halide compound is a compound as shown in Formula $R^5COX$, in which $R^5$ is $C_1$-$C_{20}$ hydrocarbyl, or hydrogen, and can be a saturated or unsaturated straight, branched, or cyclic chain, and X is halogen.

8. The catalyst component according to claim 7, wherein the acyl halide compound comprises at least one selected from the group consisting of acyl fluoride compound, acyl chloride compound, acyl bromide compound, and acyl iodide compound.

9. The catalyst component according to claim 1, wherein the halogen and silicon-containing compound is a compound as shown in Formula $(R^5O)_qSiR^6_nX_{4-n-q}$, in which $R^5$ and $R^6$ are independently selected from $C_1$-$C_{20}$ hydrocarbyl or halogenated hydrocarbyl, and can be saturated or unsaturated straight, branched, or cyclic chain; each of q and n is 0 or a positive number, and $0\leq q+n\leq3$; X is halogen.

10. The catalyst component according to claim 9, wherein the halogen and silicon-containing compound is at least one selected from the group consisting of silicon tetrachloride, silicon tetrabromide, ethoxysilicon trichloride, phenylsilicon trichloride, methylsilicon trichloride, ethylsilicon trichloride, diethoxysilicon dichloride, methylmethoxysilicon dichloride, and methylphenoxysilicon dichloride.

11. A preparation method of the catalyst component according to claim 1, comprising firstly dissolving an anhydrous magnesium halide into a mixed solvent which comprises an oxygen-containing organic titanium compound, an organic epoxy compound, a hydroxy-containing compound, and an inert solvent, and does not comprise a phosphate or a phosphite compound, so as to form a magnesium halide solution; then mixing the magnesium halide solution with a halogen-containing compound to precipitate a solid, so as to obtain the catalyst component;

wherein the organic epoxy compound is a three membered epoxy compound as shown in Formula I,

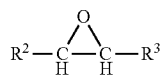
(I)

wherein, $R^2$ are W are independently selected from H, or $C_1$-$C_{10}$ hydrocarbyl or halogenated hydrocarbyl, and can be saturated or unsaturated straight, branched, or cyclic chain; or the organic epoxy compound is a 4-8 membered epoxy compound;

the halogen-containing compound comprises at least one selected from the group consisting of acyl halide compounds and halogen and silicon-containing compounds.

12. The method according to claim 11, wherein the magnesium halide solution is formed by dissolving an anhydrous magnesium halide into a mixed solvent consisting of an oxygen-containing organic titanium compound, an organic epoxy compound, hydroxy-containing compound, and an inert solvent.

13. A catalyst for olefin polymerization, comprising a reaction product of the following components:
 (a) the catalyst component according to claim 1;
 (b) at least one organic aluminum compound as shown in Formula $AlR_mX_{3-m}$, in which R is hydrogen or $C_1$-$C_{20}$ hydrocarbyl, X is halogen, and m is $0<m\leq 3$.

14. A magnesium halide solution system used for the preparation process of a catalyst component for olefin polymerization, comprising an oxygen-containing organic titanium compound, an organic epoxy compound, a hydroxy-containing compound, and an inert solvent, wherein the magnesium halide solution system does not comprise a phosphate compound or a phosphite, further wherein the organic epoxy compound is a three membered epoxy compound as shown in Formula I,

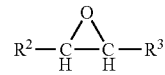
(I)

wherein, $R^2$ are $R^3$ are independently selected from H, or $C_1$-$C_{10}$ hydrocarbyl or halogenated hydrocarbyl, and can be saturated or unsaturated straight, branched, or cyclic chain; or the organic epoxy compound is a 4-8 membered epoxy compound.

15. The magnesium halide solution system according to claim 14, wherein the magnesium halide solution system is a mixed solvent which is comprised of an oxygen-containing organic titanium compound, an organic epoxy compound, a hydroxy-containing compound, and an inert solvent.

16. The catalyst component according to claim 3, wherein the inert solvent is a $C_4$-$C_{20}$ hydrocarbon.

17. The catalyst component according to claim 4, wherein the oxygen-containing organic titanium compound is selected from the group consisting of tetraethyl titanate, tetraisopropyl titanate, tetrabutyl titanate, and tetraisooctyl titanate.

18. The catalyst component according to claim 4, wherein the hydroxy-containing compound is selected from the group consisting of methanol, ethanol, isopropanol, n-butanol, n-hexanol, isooctanol, benzyl alcohol, and phenethyl alcohol.

19. The catalyst component according to claim 5, wherein calculated based on per molar magnesium halide, the oxygen-containing organic titanium compound is 0.1-1.5 mol; the organic epoxy compound is 0.1-6.5 mol; the hydroxy-containing compound is 0.1-15 mol; the halogen-containing compound is 0.5-50 mol.

20. The catalyst component according to claim 8, wherein the acyl halide compound is an acyl chloride compound.

21. The catalyst component according to claim 10, wherein the halogen and silicon-containing compound is at least one selected from the group consisting of silicon tetrachloride, silicon tetrabromide, ethoxysilicon trichloride, and phenylsilicon trichloride.

\* \* \* \* \*

UNITED STATES PATENT AND TRADEMARK OFFICE
CERTIFICATE OF CORRECTION

PATENT NO. : 10,174,141 B2
APPLICATION NO. : 15/307209
DATED : January 8, 2019
INVENTOR(S) : Shibo Wang et al.

Page 1 of 2

It is certified that error appears in the above-identified patent and that said Letters Patent is hereby corrected as shown below:

On the Title Page

Item (73):
"(73) Assignee: China Petroleum & Chemical Corporation Beijing Research Institute of Chemical Industry, China Petroleum & Chemical Corporation, Beijing (CN)" should read
--(73) Assignees: China Petroleum & Chemical Corporation, Beijing (CN); Beijing Research Institute of Chemical Industry, China Petroleum & Chemical Corporation, Beijing (CN)--.

Item (30), under Foreign Application Priority Data:
"Apr. 29, 2014 (CN) .......... 2014 1 0176103
Apr. 29, 2014 (CN) .......... 2014 1 0176105
Apr. 29, 2014 (CN) .......... 2014 1 0176179
Apr. 29, 2014 (CN) .......... 2014 1 0176229
Apr. 29, 2014 (CN) .......... 2014 1 0177192
Apr. 29, 2014 (CN) .......... 2014 1 0177203
Apr. 29, 2014 (CN) .......... 2014 1 0177228" should read
--Apr. 29, 2014 (CN) .......... 2014 1 0176103.3
Apr. 29, 2014 (CN) .......... 2014 1 0176105.2
Apr. 29, 2014 (CN) .......... 2014 1 0176179.6
Apr. 29, 2014 (CN) .......... 2014 1 0176229.0
Apr. 29, 2014 (CN) .......... 2014 1 0177192.3
Apr. 29, 2014 (CN) .......... 2014 1 0177203.8
Apr. 29, 2014 (CN) .......... 2014 1 0177228.8--.

In the Claims

Claim 1, Column 23, Line 50, "$R^2$ are $R^3$ are" should read --$R^2$ and $R^3$ are--.

Signed and Sealed this
Thirtieth Day of April, 2019

Andrei Iancu
*Director of the United States Patent and Trademark Office*

Claim 11, Column 25, Line 20, "$R^2$ are Ware" should read --$R^2$ and $R^3$ are--.

Claim 14, Column 26, Line 11, "$R^2$ are $R^3$ are" should read --$R^2$ and $R^3$ are--.